United States Patent [19]

Hirao et al.

[11] Patent Number: 5,030,408
[45] Date of Patent: Jul. 9, 1991

[54] METHOD OF PRODUCING MOLDED RESIN ARTICLE

[75] Inventors: Keiichiro Hirao, Osaka; Kazuyuki Nakamura, Hiroshima; Tadamoto Sakai, Hiroshima; Shigeki Inoue, Hiroshima; Fumiaki Tsuda, Tokyo, all of Japan

[73] Assignees: Japan Steel Works Ltd, Tokyo; Nagase Co., Ltd., Osaka, both of Japan

[21] Appl. No.: 311,783

[22] Filed: Feb. 17, 1989

[30] Foreign Application Priority Data

Feb. 18, 1988 [JP] Japan .................. 63-33921
Jan. 20, 1989 [JP] Japan .................. 1-9783

[51] Int. Cl.⁵ ............................................ B29C 45/02
[52] U.S. Cl. .......................... 264/328.6; 264/328.2; 264/328.18
[58] Field of Search ............. 264/328.6, 328.2, 349, 264/211.23, 68, 328.18; 425/208; 525/177, 232

[56] References Cited

U.S. PATENT DOCUMENTS

| | | | |
|---|---|---|---|
| 2,935,763 | 5/1960 | Newman et al. | 264/349 |
| 3,557,256 | 1/1971 | Muskat | 264/331.15 |
| 3,734,985 | 5/1973 | Greenberg | 264/328.1 |
| 3,767,754 | 10/1973 | Manning et al. | 264/211.23 |
| 3,972,977 | 8/1976 | Fry | 264/311.16 |
| 4,005,054 | 1/1977 | Bonnefon et al. | 264/331.13 |
| 4,300,840 | 11/1981 | Kishihiro | 425/208 |
| 4,369,278 | 1/1983 | Kasahara et al. | 264/328.6 |
| 4,520,181 | 5/1985 | Klosiewicz | 264/328.6 |
| 4,657,499 | 4/1987 | Lewellen et al. | 264/349 |
| 4,663,103 | 5/1987 | McCullough et al. | 425/204 |

FOREIGN PATENT DOCUMENTS 51-047963  4/1976  Japan .................. 425/208

Primary Examiner—Robert A. Dawson
Assistant Examiner—Allan R. Kuhns
Attorney, Agent, or Firm—Sughrue, Mion, Zinn, Macpeak & Seas

[57] ABSTRACT

A method of forming a composite material involves feeding materials to a kneader, kneading the materials, and injecting them from the kneader into a mold. The kneader is formed by a screw-type extruder having an ejection outlet at one end for extrusion into the mold. Various input ports are located axially along the extruder. Materials are fed into the kneader beginning at the inlet port most remote from the outlet end and proceeding successively to the inlet port nearest the outlet end. The materials are fed in successive order from those with the highest viscosity and lowest reactivity relative to the materials with the highest reactivity and lowest viscosity. For example, thermoplastic is fed to the inlet most remote from the outlet, and thermosetting resin is fed to the inlet nearest the outlet. In another aspect of the invention, in which thermoplastic and thermosetting resins are employed in roughly comparable amounts, an "island-in-sea" structure is desired. This structure is achieved by agglomerating thermoplastic material having a particle diameter of 0.05–0.5 μm into particles of 10–1000 μm diameter prior to kneading, then introducing the thermoplastic material into the kneader. The thermoset material is then added from least reactive and most viscous to most reactive and least viscous.

18 Claims, 1 Drawing Sheet

METHOD OF PRODUCING MOLDED RESIN ARTICLE

BACKGROUND OF THE INVENTION

The present invention relates to a method of producing a molded resin article. More particularly, the present invention relates to a method of producing a molded resin article composed of a mixture of thermoplastic and thermosetting materials.

In addition, the present invention relates to a method of fabricating a molded article from a composite material created by melting a thermosetting resin component and a thermoplastic resin component, kneading the components and immediately injecting the resultant composite material into a mold where the kneaded melt is given a desired shape.

Resins can be molded by various methods depending upon such factors as the physical properties of feed materials and those of the finished article. Thermoplastic resins are in most cases shaped by injection molding, in which a molten resin is injected at high pressure into a cavity between closed mold parts and given a desired shape. The injection molding process has a high production rate and great latitude in the selection of the shapes of molded articles.

The injection molding technique, however, has the following disadvantages: (1) a large clamping force must be used during molding and thus a bulky molding machine is required; (2) it is practically impossible to fabricate thin-walled and large parts; and (3) the molten resin must have high temperature and pressure when it is injected into the mold cavity, such that simultaneous lamination of skin members such as fabrics and PVC leather cannot be achieved without high risk of damage to the texture of the skin members. The third problem is particularly pronounced in the case where napped fabrics are to be simultaneously laminated and flattening of naps is unavoidable. Electronic parts are often required to be sealed with resins. However, if injection molding is adopted to encapsulate the parts, displacement of parts, breaking of lead wires and other problems can occur owing to the high injection pressure employed. Furthermore, when molding resins are used as sealants of electronic parts, the resins are generally required to be fire-retardant. However, many of the fire-retardant resins available today have a tendency to decompose or deteriorate at elevated temperatures required for injection. Therefore, simultaneous lamination of skin members and resin molding of electronic parts are very difficult to accomplish by customary injection molding techniques. A fourth problem with the injection molding process is that since the resin material will pass through the whole length of the cylinder of a kneader at high speed under high pressure, long glass fibers cannot be incorporated without breaking into short lengths. In addition, use of a relatively high amount of glass fibers or inorganic fillers is difficult.

In order to cope with these problems, one needs to employ resin materials having a high melt index and inject them while in molten state into the mold cavity at low temperature and pressure, with the viscosity of the melt being reduced at the time of injection. In the case of thermoplastic resins, materials of high melt index are polymers of low molecular weights but articles molded from such low-molecular weight polymers are not satisfactory in many aspects including impact strength, fatigue strength, creep resistance, chemical and solvent resistance, and resistance to environmental stress cracking. In other words, in order to ensure that a resin feed solely composed of thermoplastic materials is injection molded at low temperature and pressure, the strength of the shaped article has to be sacrificed but such a sacrifice is not desired from a practical viewpoint.

Compared to thermoplastics, thermosets are low in viscosity when they are in a molten state but as a thermosetting reaction proceeds, they will cure and thus increase in viscosity. Therefore, to perform injection molding with an in-line machine, one of the following methods must be used: i) curing the resin by heating it after it has been injected into the mold cavity rather than in the injection cylinder; or ii) using a so-called "premix" prepared by compounding the ingredients after they have passed through a certain degree of reaction. However, the first method in which the resin is cured by heating in the mold cavity suffers from the disadvantage of extended molding cycles. The second method which involves the use of a premix is subject to significant limitations on such factors as the compounding formulation and the choice of starting materials.

A method that is commonly adopted in molding thermosetting resin materials having the problems described above includes first preparing a sheet molding compound (SMC) or bulk molding compound (BMC) which has a thermoset of interest, say, an unsaturated polyester impregnated in a glass mat or glass fibers, and then molding SMC or BMC by compression or with matched dies. However, this method is not suitable for high-volume production since the metering and supply of materials is not easily adaptable for automation or continuous processes.

Thermoplastic resins, typically polyurethanes, are often molded by reaction-injection molding (RIM) processes in which two liquid streams are pumped under high pressure into an impingement chamber where they are mixed intimately and then are immediately forced into a mold cavity where a rapid polymerization reaction occurs. However, the major disadvantage of the RIM process is a small freedom in the choice of compounding formulas because the materials that can be used are limited to those which are low in viscosity and high in reactivity. Furthermore, the viscosity of the resin is so low at the time of injection as to cause various troubles such as an increased chance of burring and formation of voids on account of bubble trapping, extensive bleeding in the bulk of fabrics to be laminated simultaneously, and difficulty in relatively highly loading reinforcements or fillers on account of the great tendency toward solid-liquid separation.

A possible alternative to injection molding of thermoplastics is stamping, in which a molten material is deposited onto an open matched mold and stamped by closing the mold. During stamping, the material flows, filling the mold cavity. Compared to injection molding, this method tolerates the use of low pressures and is suitable for fabricating large and thin-walled parts. However, so long as thermoplastics are used, there are limits on the effort toward temperature and viscosity reduction and the stamping method is still insufficient to completely eliminate the defects of the injection molding process.

As described above, all conventional methods for molding thermoplastic or thermosetting resins have their own problems and generally speaking, thermoplastics are adapted for high production processes. Another advantage of thermoplastics is that they can be molded into articles having a higher degree of toughness. In contrast, articles molded from thermosetting resins are almost brittle and prone to chipping but they are excellent in such properties as stiffness, heat resistance, stress cracking resistance and creep resistance. It is therefore expected that a molded article that is superior in production rate and physical properties will be obtained from thermoplastic and thermosetting resin materials that are blended in an appropriate composite form.

However, none of the molding methods currently in commercial use are capable of producing composites of desired thermoplastic and thermosetting resin materials in desired proportions. One of the practices that has been adapted extensively is to incorporate thermoplastic components as modifiers in SMC or BMC of unsaturated polyesters but the thermoplastic components that can be added have been limited to those which are soluble in the principal components of thermosets such as alkyds and styrene monomers. Besides this restricts compounding formulation, i.e. the contents of thermoplastic components that can be incorporated have been limited.

An attempt has also been made to fabricate thermoplastic resins by injection molding on an in-line machine after thermosetting components have been added. But in this case, too, the contents of thermosetting components that can be added are limited to low levels because if they are excessive, they undergo a curing reaction and the resulting mix becomes too viscous to be efficiently injected into the mold cavity.

As will be understood from the foregoing discussion, when thermoplastic and thermosetting resin materials are to be mixed and molded by previously known methods, either one type of resin serves as the principal component with the other being used merely as an additive, and it has been impossible for the two types of resins to be mixed in more or less comparable amounts, e.g. from 25:75 to 75:25, and directly subjected to a molding step.

In order to realize fabrication of large and thin-walled parts, simultaneous lamination of skin members, resin molding of electronic parts, high loading of glass fibers, or incorporation of long fibers, the molten material must be injected into a mold cavity not only at an optimum viscosity (e.g. lower than the viscosity encountered in ordinary injection molding of thermoplastics but higher than the viscosity encountered in RIM but also at low temperature and pressure. However, it has been impossible with conventional molding processes to accomplish the necessary adjustment or control of resin viscosity and temperature.

It is further noted that in order to attain a balance of high-level physical properties in a composite material, one of the ideal structures is a micro dispersion in which islands of a toughness imparting component are dispersed in a sea of a stiff and heat-resistant matrix. This ideal structure would be obtained by using a thermosetting resin as a component for stiffness and heat resistance of the matrix, and employing a thermoplastic resin as a component for toughness of the islands. It is desirable to use a rubber-like material as the thermoplastic resin component.

Conventional composite materials that are prepared by kneading two types of resin components, thermosets and thermoplastics, are characterized in that the thermoplastic resin component or rubber component is dispersed in a minor proportion in the thermosetting resin component. The rubber component is dissolved in the thermosetting resin component and when the solution changes from a fluid to a solid state upon reaction, the dissolved rubber component undergoes phase separation to form an emulsion in which the islands of the rubber component are microscopically dispersed in the sea of the thermosetting resin component. However, with conventional composite materials, the solubility of the rubber component is limited and it cannot be dissolved in an increased amount in the thermosetting resin component. Furthermore, the viscosity of the thermosetting resin component cannot be controlled with sufficient ease to enable efficient molding with customary machines including injection molding and extrusion machines. Even if a composite material in which the thermoplastic resin component and the thermosetting resin component are mixed in more or less comparable proportions is successfully molded, the islands of the thermoplastic resin component are not sufficiently dispersed microscopically in the sea of the thermosetting resin component to produce a molded article that attains a balance between stiffness, heat resistance and toughness at high levels. The following three principal reasons are offered to explain this problem: first, because of the nature of rubbery materials which form islands and are responsible for the toughness of the composite, considerable difficulty is involved in comminuting (pulverizing) the rubbery material into fine particles. Even if this is possible, the particles are so sticky as to experience frequent blocking, which makes it difficult to attain a particle size that is ideal for the formation of a desired dispersion; second, the island phase should generally be composed of particles on the submicron order but such fine particles tend to scatter as dust particles and this is detrimental not only to handling but also to the consistency of the supply of the rubber component through a feeder, etc.; and third, the rubber-like particles dispersed in the sea of the matrix resin will re-fuse during melt mixing under thermal effects, making it impossible to obtain an ideal dispersion.

SUMMARY OF THE INVENTION

The objects of the present invention are to solve the above-mentioned problems.

The principal object of a first aspect of the present invention is to enable the fabrication of a molded article from a resin composite in which thermoplastic and thermosetting resins are incorporated in more or less comparable proportions.

Another object of the present invention is to provide a molding method that is adapted for large-scale production of molded articles from a composite of thermoplastic and thermosetting resins.

Still another object of the present invention is to provide a method of producing a molded resin article which allows for optimal adjustment of the viscosity of a molten resin mix to be injected into a mold cavity, thereby limiting the temperature and pressure of the resin to lower levels.

A further object of the present invention is to provide a method of producing a molded composite resin article that allows for kneading with a screw-type extruder, thereby enabling the compounding of desired materials.

To attain these objects, in the inventive method, a plurality of materials including a thermoplastic component and a thermosetting component are successively fed into a kneader, with a time lag being provided between the first supplied material having a higher melting point, viscosity and stability relative to the next supplied material which has a lower viscosity and a higher reactivity, and kneaded in said kneader, and injecting the resulting blend to fill a mold cavity and give a desired shape.

The principal object of a second aspect of the invention is to provide a method of fabricating a molded article from a composite material that contains a thermosetting resin component and a thermoplastic resin component mixed in more or less comparable proportions (e.g. 25:75 to 75:25) and which yet features an island-in-sea structure in which the thermoplastic resin component is microscopically dispersed in the matrix of the thermosetting resin component to ensure a balance among high levels of stiffness, heat resistance and toughness.

The above-stated object of this second aspect of the invention can generally be attained by using a composite material that comprises more or less comparable proportions of a thermosetting resin component responsible for stiffness and heat resistance and a thermoplastic resin component responsible for toughness and in which the islands of said thermoplastic resin component having a particle size of 0.01–10 μm are microscopically dispersed in the sea of the thermosetting resin matrix to provide an island-in-sea structure. More specifically, the particles of the thermoplastic resin component are subjected to secondary agglomeration to produce larger particles of 10–1000 μm that can be dissociated by shearing, and such particles are kneaded under shear force with the portion of the thermosetting resin component which has a relatively low reactivity and a relatively high viscosity, thereby allowing the particles to be dispersed microscopically in that portion; thereafter, those portions of the thermosetting resin component which have a relatively high reactivity and a relatively low viscosity are successively added, with a time lag provided between the first supplied portion having the lower reactivity and the higher viscosity and the next supplied portion having the higher reactivity and the lower viscosity; after all the components have been kneaded, the mixture is immediately injected into a mold cavity where it is given a desired shape and allowed to solidify simultaneously with completion of the curing of the thermosetting resin component.

BRIEF DESCRIPTION OF THE FIGURE

The above and other objects, features and advantages of the inventive method will become more evident upon reading the detailed description set forth below in conjunction with the accompanying drawing.

DETAILED DESCRIPTION OF THE INVENTION

Figure 1:
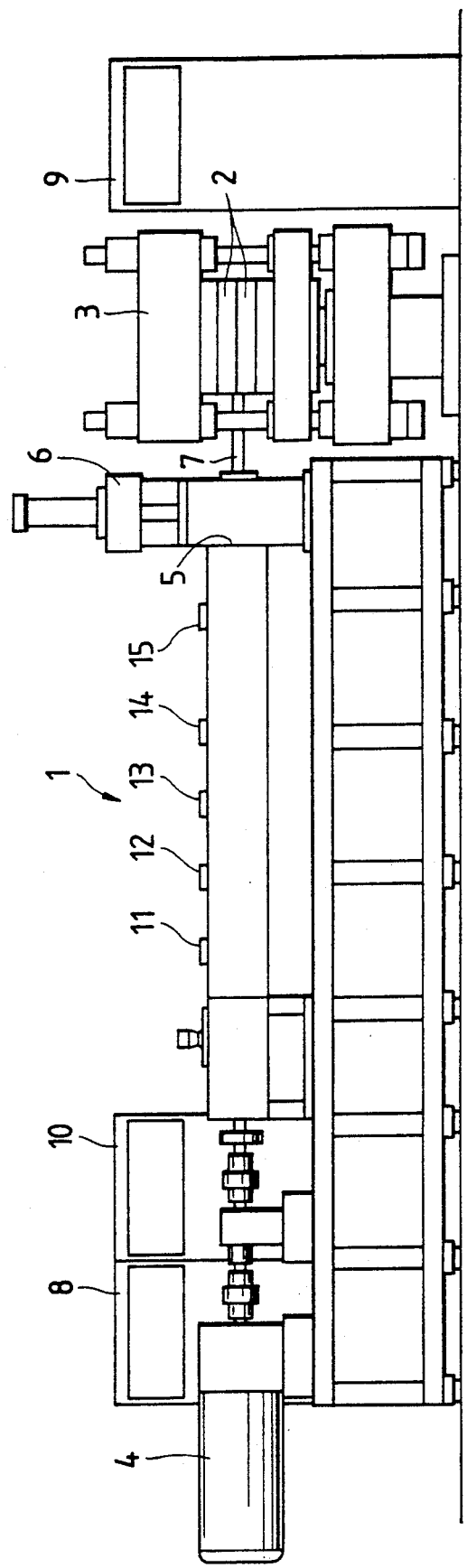
FIG. 1 is a schematic side view of a molding apparatus for use in the practice of the present invention.

According to a first aspect of the invention, feed materials are inputted to a kneader, then kneaded into a mixture, and the mixture is injected into a mold for molding. The feed materials are inputted to the kneader generally in the order of decreasing viscosity and melting point yet increasing reactivity.

In general, in the molding process, the viscosity of the molten mixture when it is injected into a mold cavity is desirably controlled to be in a low range of 200–5000 poises. Such viscosity adjustments can be performed by properly selecting the conditions of supplying feed materials into the kneader, such as the timing of their supply, the temperature at which they are supplied and the proportions of the respective materials.

The kneader may be of a screw-type extruder. When a screw-type extruder is to be used, a plurality of feed supply inlets are provided in the axial direction and a material having a higher melting point, viscosity and stability is fed at a supply inlet which is remote from the discharge port of the extruder whereas a material having a lower melting point and viscosity and a higher reactivity is fed at a supply inlet nearer to the discharge port. However, the above mentioned melting point may be not always defined in the present invention because there exists materials with specific melting point characteristics.

When a screw-type extruder is used, it is also desirable to provide a viscosity gradient such that the melt viscosity of the plasticized mix in the cylinder decreases toward the discharge end of the extruder. Such a viscosity gradient can be readily produced by properly selecting the conditions under which feed materials are supplied. Such conditions include their proportions, the temperature and the degree of preliminary plasticization.

As described above, in the inventive method, a thermoplastic resin or material having a high melting point, viscosity and stability relative to the other feed materials is supplied into a kneader at the initial stage of the kneading step to allow for sufficient plasticization. By contrast a thermosetting resin or material having a low melting point and viscosity and a high reactivity relative to the other feed materials is supplied into the kneader at a later stage of the kneading step, so that its kneading time is sufficiently short to avoid curing that would otherwise occur owing to excessive reaction in the kneader. The thermosetting material in such a low-viscosity state is kneaded with the plasticized thermoplastic material and the resulting mix is injected to fill a mold cavity. Therefore, the viscosity of the mix when it is injected into the mold is sufficiently reduced to enable filling of the mold cavity at low temperature and pressure so as to facilitate the molding of the mix.

The method according to the present invention also enables thermoplastic and thermosetting materials to be incorporated in relatively high proportions. Furthermore, the molten feed materials are kneaded under high shear in the kneader, so that any compounding formulation can be used substantially independent of the miscibility and dispersibility of the feed materials used.

Hereinafter, the thermoplastic resin or material with the high melting point, viscosity and stability will be referred to as the high melting point, viscosity and stability material. This high melting point, viscosity and stability material has a melting point, viscosity and stability which are high relative to the other feed materials used in the molding process. In addition, the thermosetting resin or material with the low melting point and viscosity and high reactivity will be referred to as the low melting point and viscosity and high reactivity material. This material has a low melting point and viscosity and a high reactivity relative to the other feed materials. In the inventive method, preferably the material with the highest melting point, viscosity and stability is fed into the kneader first, and the material with the lowest melting point and viscosity and the highest reactivity is fed last, with any other feed materials being fed according to their relative melting points, viscosities and stabilities/reactivities.

If the melt viscosity of the kneaded mix is in the low range of 200–5000 poises when it is injected into the mold cavity, the feed materials will fill every part of the cavity even if the mold is shaped for fabricating a thin-walled product. At the same time, problems that would otherwise occur on account of undesirably low viscosities (e.g. lower than 200 poises) are minimized.

If the kneader is a screw-type extruder and if the material having a high melting point, viscosity and stability is supplied at a feed inlet that is remote from the discharge port of the extruder whereas the material having a low melting point and viscosity and a high reactivity is supplied at a feed inlet that is near to the discharge port, the material with the high melting point and viscosity and high stability will be fully plasticized as it is transferred toward the discharge port of the kneader whereas the material having a low melting point and viscosity and a high reactivity is kneaded together with the fully plastiziced material, and the mixture is immediately transferred into the mold cavity, with the mixture being held in a desired low-viscosity state (e.g. 200 to 5000 poises). In this way, a molded composite resin article is efficiently produced.

If a feed containing a substantial amount of thermosetting component is supplied into a conventional screw-type extruder, the viscosity of the feed will increase with time. This creates low viscosity at the feed supply end and high viscosity at the discharge end, with slippage in the extruder barrel occurring at the supply end of the extruder to make further transfer of the plasticized mixture impossible. To avoid this problem, an extruder that has a plurality of feed inlets along its axial direction is used and the viscosity of the feed is controlled to decrease toward the discharge end of the extruder by properly selecting various conditions. These conditions include the shape and type of the materials to be supplied at the various feed inlets, the temperature of the feed materials and/or inlets and the degree of preliminary plasticization of the feed materials. Thus, the inventive method includes the advantage that the materials can be transferred smoothly through the cylinder of the extruder.

Preferred embodiments of the present invention are described hereinafter with reference to FIG. 1 which is a schematic side view of a resin molding apparatus that may be employed in the inventive method. As is clear from FIG. 1, the molding apparatus has a screw-type extruder 1, a mold 2, and a clamp mechanism 3 for closing or opening the mold. The screw in the extruder 1 is rotatably driven by a motor 4, causing the feed in the cylinder to be plasticized and kneaded as it is transferred to the right in the drawing. The extruder 1 is equipped at discharge port 5 with a unit 6 that discharges a metered amount of the kneaded feed. The metering/discharging unit 6 is connected to the feed injection port of the mold 2 via a heat-insulated transfer pipe 7.

The operating conditions of the extruder 1, such as the rotational speed of the screw and the cylinder temperature, are controlled at an extruder control panel 8. The unit 6 and the clamp mechanism 3 are controlled at a control panel 9.

The extruder 1 has a plurality of feed supply inlets disposed at given spacings in its axial direction. In the embodiment of FIG. 1, five feed inlets 11–15 are provided. The first inlet 11 (the furthest from the discharge port 5) is chiefly adapted for the charging (feeding) of a pelletized thermoplastic material that is fed from a hopper or some other suitable device. The second inlet 12 is adapted for the supply of a granular or powdered thermoplastic component or a similar form, comparatively stable thermosetting component. The third inlet 13 is for a thermosetting component of a comparatively low reactivity that is in a granular, powdered or liquid form. Where the molded article is desired to include fibrous reinforcement (e.g. glass fiber), the fourth inlet 14, which is closer to the discharge port 5, is used for continuous supply of the reinforcement from a side feeder or other suitable means so that the reinforcement can be kneaded with the mixed materials of lower viscosity. The fifth inlet 15 (the nearest to the discharge port 5) is for the supply of such materials as unstable reactive fluids and peroxide catalysts.

Materials are supplied through the respective inlets 11–15 by various means such as a metering feeder and a metering/discharging pump. These feeding devices are controlled at a feeder control panel 10.

To fabricate the molded article from a resin composite made of a thermoplastic and a thermosetting resin, the feed inlets 11–15 on the cylinder of the extruder 1 are adjusted for predetermined temperatures. The first inlet 11 is set at a high temperature while the fifth inlet 15 is set at a low temperature, and the respective materials are supplied through the most appropriate inlets in view of their characteristics, as explained in more detail below.

Pellets of a thermoplastic resin which is a stable material having a high melting point and viscosity are supplied through the first inlet 11. Since the first inlet 11 is the most remote from the discharge port 5, the material supplied through this inlet will be in the extruder 1 for a long time before reaching the discharge port 5. Therefore, the material supplied will be subjected to a shear action by the screw sufficient to plasticize it to a desired extent, and the viscosity of the material will decrease toward the discharge end as plasticization proceeds.

A granular or powdered thermoplastic component or a similarly shaped thermosetting component of low reactivity is supplied through the second inlet 12. These materials, as they are heated within the extruder 1, will be rapidly plasticized and melted and thus become low in viscosity.

A liquid thermosetting material which has a comparatively high reactivity is supplied through the third inlet 13.

A liquid thermosetting material that is labile and has a very high reactivity, as well as a catalyst and so forth are supplied through the fifth inlet 15. Therefore, these materials will be pushed out of the extruder 1 within a short period of time.

As described above, stable materials that are high in melting point and viscosity are supplied through the first and second inlets 11 and 12 which are remote from the discharge port 5. If desired, these materials are supplied into the extruder 1 after they have been subjected to a preliminary plasticizing step to ensure that they will be plasticized and melted to a satisfactory degree in the extruder 1. By contrast, materials having a higher reactivity are supplied through inlets 13 and 15 which are closer to the discharge port 5. As a result, these materials will stay for only a short time within the extruder 1 thus avoiding excessive curing action from occurring in the extruder 1. Therefore, thermosetting resins can be incorporated in relatively high proportions without potential curing within the extruder 1.

Since materials of low viscosity are successively added to and kneaded with plasticized thermoplastic materials, the viscosity of the resulting mix will decrease toward the discharge end of the extruder. This is true even though the viscosity of the thermosetting components has a tendency to increase as a result of heating which occurs during kneading in the extruder 1, because any curing of these thermosetting components is sufficiently repressed to prevent elevation of the overall viscosity of the kneaded mixture.

For the reasons stated above, the viscosity gradient of the feed material in the extruder 1 is such that it is high in the area beneath the first inlet 11 and low in the area adjacent the discharge port 5. This ensures that the materials fed into the extruder will be pushed by the action of the screw from the side of the first inlet 11 and constantly transferred toward the discharge port 5. The viscosity gradient of the feed material being transferred can be adjusted by properly selecting various conditions of its supply, including the type of materials, their shape, the proportions of the components, the positions of the feed inlets, as well as the temperature and viscosity of the materials fed through the inlets 11-15. These conditions of the supplied materials are also adjustable to control the viscosity of the feed material at the discharge port 5. The viscosity of the feed material at the port 5 may be determined in accordance with such parameters as the shape of the final article to be fabricated, its physical properties and the structure of the mold 2, but it is usually adjusted to lie within a low viscosity range of 200 to 5000 poises.

In accordance with the inventive method, the feed material in a molten state is kneaded under the high shear action exerted by the screw and is immediately injected into the mold to be given a desired shape. Therefore, a feed of any formulation can be provided with a desired mixed and dispersed state irrespective of the miscibility and dispersibility of the individual components of the feed. In other words, the inventive method allows greater latitude in the selection of feed materials.

Using the method described above, a plasticized mixture of low viscosity that has been prepared by kneading thermoplastic and thermosetting materials will emerge from the discharge port 5 of the extruder 1. The temperature of this plasticized mixture is held at a comparatively low level by controlling the temperature of the cylinder in the extruder 1. The plasticized mixture is metered in the unit 6 and discharged therefrom for injection into the mold 2 through the transfer pipe 7. Since the pipe 7 is heat-insulated, the materials in the plasticized mixture will not cure while passing through the pipe 7. If necessary, the pipe 7 may be heated or cooled for temperature control.

The plasticized mixture may be injected into the mold 2 in a closed state, as in ordinary injection molding machines. Alternatively, as in a stamping molding machine, the plasticized mixture may be injected into an open mold, which is thereafter closed and clamped. As already mentioned, the plasticized mixture which is injected into the mold 2 is in a low-viscosity state, so it will fill every part of the mold cavity even if it is injected at low pressure. As a further advantage, the mixture is injected into the mold at low temperature so that a skin member can be laminated simultaneously without thermal deterioration.

The plasticized mixture in the mold 2 is then shaped and cured in that state to produce a molded article of a desired shape.

If it is necessary to incorporate a fibrous reinforcement such as glass fibers in the article they are supplied through the fourth inlet 14 which is relatively close to the discharge port 5. By so doing, the time for which the reinforcement is subjected to the shearing action of the screw is sufficiently shortened to minimize any fiber breakage and to allow long fibers to retain their length while they are kneaded with the feed material and to emerge from the port 5. In addition, the feed material with which the reinforcement is to be kneaded has been fully plasticized to a low viscosity, so it can be incorporated in the feed material in a high proportion.

The embodiment described above assumes the use of the screw-type extruder 1 but it should be understood that a common kneader such as a batch-typed kneader can also be used in the inventive method. In this case, a material having a high melting point, viscosity and stability is first fed into the kneader and then plasticized. A material having a low melting point and viscosity and a high reactivity is supplied to the kneader with the previously supplied and plasticized material.

The method of the present invention is described hereinafter in greater detail with reference to specific examples of fabricating molded articles by the method.

EXAMPLE 1

A screw-type extruder having four feed inlets was connected to a vertical type stamping press for simultaneous lamination of a napped fabric. The screw-type extruder was supplied with the following materials: pellets of SBS (styrene-butadiene-styrene copolymer, a thermoplastic material) were supplied through the first feed inlet which was located further from the discharge end; granules of a thermosetting unsaturated polyester were supplied through the second inlet; a liquid bifunctional oligomer was supplied through the third inlet; and a peroxide catalyst was supplied through the fourth inlet which was the nearest to the discharge port. The first to fourth inlets were adjusted to respective temperatures of 110°, 100°, 90° and 80° C. The mold was adjusted to a temperature of 120°-150° C. on the core side and 60°-80° C. on the fabric side. The clamping pressure was set within a range of 20-50 kg/cm$^2$. The feed material had a viscosity of 1000 poises at the time of injection into the mold.

The resulting molded article was homogeneous and defectless in the resin portion. There was an absence of flattened naps in any part of it, so the molded article was quite suitable for practical applications.

EXAMPLE 2

Caseless molding of a polypropylene film capacitor was performed using the same apparatus and materials as those employed in Example 1, except that the mold temperature was 120° C. In addition, the clamping pressure and the viscosity of the feed material upon injection into the mold was adjusted to values slightly lower than those employed in Example 1.

The resulting molded article was acceptable in that it was free from broken lead wires and shrinkage of the polypropylene film.

As will be understood from the foregoing explanation, the method of the present invention offers the following advantages. First, a thermoplastic material having a relatively high melting point, viscosity and stability is supplied into a kneading machine at the initial stage of the kneading step and kneaded for a sufficiently long period of time to ensure plasticization to a satisfactory degree. Second, a thermosetting material having a relatively low melting point and viscosity and a higher reactivity is supplied into the kneader at a later stage of the kneading step, so that this material can be kneaded without excessive curing in the kneader. Third, the supplied materials can be kneaded in a molten state without causing phase separation in the kneader. Therefore, even if thermoplastic and thermosetting resin materials are used in more or less comparable proportions, they can be kneaded and injected in a low-viscosity state to fill the mold. In this way, it is possible to fabricate a molded article from a composite resin that has both thermoplastic and thermosetting resin components incorporated in high proportions. Fourth, by properly selecting the supply conditions such as the type of materials, their shape, the proportions of the respective components and the timing of their supply, a plasticized mixture of the feed can be injected into a mold cavity at low temperature, pressure and viscosity. Therefore, the inventive method allows fabrication of thin-walled large parts, simultaneous lamination of skin members or even resin molding of electronic parts using a simple molding apparatus which requires a low clamping pressure.

According to a second aspect of the invention, a molded article is formed from more or less comparable proportions of a thermosetting resin and a thermoplastic resin to achieve a material with stiffness and heat resistance comparable to that of a thermosetting article and with toughness comparable to that of a thermoplastic resin.

It is effective for the purposes of the second aspect of the present invention to use a rubber-like component as the thermoplastic resin component. It is particularly effective to use a fine particulate rubber that is prepared by emulsion polymerization and has an anti-blocking property (achieved by appropriate processing well-known in the art). Alternatively, the rubber-like component may be formed of particles having either a core-/shell structure or a salami-sausage structure. The term "salami-sausage structure" means a multi-core particle.

In order to attain a highly tough composite material of an island-in-sea structure, it is necessary that the microscopically dispersed island phase comprise particles of a size in the range of 0.01–10 μm, desirably 0.05–0.5 μm. Based on this observation, the particles of a thermoplastic resin component are subjected to secondary agglomeration to form larger particles of a size in the range of 10–1000 μm that can be dissociated by shearing but which will otherwise remain stable during molding cycles so that these particles will exhibit improved fluidity within the hopper on the molding machine and/or will not scatter. These large particles of the thermoplastic, resin component are kneaded under shear force with a portion of a thermosetting resin component which has a relatively low reactivity and a relatively high viscosity, thereby allowing these particles to be microscopically dispersed in the portion of the thermosetting resin. Thereafter, those portions of the thermosetting resin component which have a relatively high reactivity and a relatively low viscosity are successively added, with a time lag being provided between the first supplied portion having the lower reactivity and the higher viscosity and the next supplied portion having the higher reactivity and the lower viscosity, and all the components are kneaded to a satisfactory degree. The mixture is immediately injected into a mold cavity where it is given a desired shape and allowed to solidify simultaneously with completion of the curing of the thermosetting resin component. In this way, particles in the island phase of the thermoplastic resin component will have a size in the range of 0.01–10 μm.

If a twin-screw extruder is used as a means for applying shear force, kneading can be performed in such a way that the thermoplastic resin component forming an island phase is added after that portion of the sea-phase forming thermosetting resin component which has a relatively low reactivity and a relatively high viscosity is first melted by heating. Alternatively, the two components may be simultaneously supplied to the kneader. Thereafter, the high-reactivity portion of the thermosetting resin component, a catalyst and a curing agent are successively added at given time intervals and kneaded. In this way, a temperature that is adequately lower than the melting point of the thermoplastic resin component (serving as a toughness imparting component) can be maintained throughout the molding process and the particles of the thermoplastic resin component will be prevented from re-fusing under thermal effects thus ensuring a desired structure in which the islands of the thermoplastic resin component are microscopically dispersed in the sea of the thermosetting matrix.

The size of secondary particles that have been formed by agglomeration of primary particles is adjusted to lie within the range of 10–1000 μm. If their size is greater than 1000 μm, some secondary particles will remain in the matrix without being completely dissociated by the shear force exerted during kneading. If their size is smaller than 10 μm, the miscibility with the matrix is not very high. In addition, if materials are selected that differ greatly in viscosity, some of the agglomerated particles will remain incompletely dissociated. The exact reason for this insufficiency in the degree of dissociation is not clear. However, it is postulated that under the conditions described above, the necessary dissociating force will not work very effectively on the agglomerated particles.

If a fine particulate rubber, which has been processed to acquire an anti-blocking property, is prepared by emulsion polymerization and is used as a rubber-like component (i.e., as the thermoplastic component), its secondary particles can be dissociated and dispersed as ideally sized particles by kneading.

If desired, a rubber-like component having a core shell structure or a salami-sausage structure may be used as the thermoplastic resin component. In this case, by properly selecting the structure of the shell or skin layer, an improvement in wetting and adhesion at the interface between the thermoplastic and thermosetting resin components can be readily attained.

It is also possible to use a rubber-like material of a polymeric structure, e.g. chlorinated polyethylene, that has both microscopic crystalline and amorphous portions. In this case, the crystalline portion serves as a nuclear whereas the amorphous portion exhibits not only affinity for the sea phase but also toughness by itself, thereby imparting toughness to the resulting composite resin material.

The following example is provided only to further illustrate the present invention, and is not to be construed to limit the present invention or the scope of the appended claims.

EXAMPLE 3

Molded specimens were fabricated from composite materials by the method specified herein. In all specimens, an unsaturated alkyd resin (Polymal 6011 EH of Takeda Chemical Industires, Ltd.) was used as a thermosetting resin component which forms a matrix sea phase. As a toughness imparting thermoplastic resin component, one of the following four materials was used: powdered, partially crosslinked NBR (acrylonitrile-butadiene rubber) prepared by emulsion polymerization; powdered MBS (methacrylate-butadiene-styrene copolymer having a microscopic core shell structure); SBS (styrene-butadiene-styrene block copolymer); and powdered chlorinated polyethylene. The molding process was as follows: a selected rubber-like material and the unsaturated alkyd resin were supplied simultaneously into a twin-screw extruder through the first hopper throat; after a certain time, a nonvolatile bifunctional monomer serving as a crosslinking agent for the unsaturated alkyd resin was supplied through the second inlet, and finally a peroxide catalyst was supplied through the third inlet. After intimately kneading the supplied materials, the composition extruded from the nozzle at the end of the extruder was immediately injected into a mold where it was given a desired shape.

The specimens thus fabricated were subjected to various tests to evaluate the performance of the toughness imparting materials used. The results are shown in Table 1.

TABLE

| Run No. | Toughness imparting component | Size of secondary particle ($\mu$) | Content of toughness imparting component (%) | Physical properties of molded article | | |
|---|---|---|---|---|---|---|
| | | | | Flexural strength (kg/cm$^2$) | Flexural modulus of elasticity (kg/cm) | Impact strength on DuPont tester g $\times$ cm |
| 1 | NBR | 400–700 | 30 | 700 | 11000 | 500    35 |
| 2 | NBR | 400–700 | 35 | 620 | 9500 | 1000    40 |
| 3 | NBR | 400–700 | 40 | 510 | 6000 | 1000    50 |
| 4 | MBS | 250–400 | 40 | 700 | 14000 | 300    15 |
| 5 | SBS | (Pellet) | 40 | 340 | 7000 | 300    5 |
| 6 | chlorinated polyethylene | 500–900 | 40 | 500 | 8000 | 1000    20 |

NBR: JMN2 of Japan Synthetic Rubber Co., Ltd.
MBS: Kaneace B-56 of Kanegafuchi Chemical Industry Co., Ltd.
SBS: TR-2000 of The Nippon Synthetic Chemical Industry Co., Ltd.
Chlorinated polyethylene: Elaslen 403A of Showa Denko K.K.

As is clear from Table 1 the powdered partly crosslinked NBR exhibited the greatest toughness imparting effect of all the compounds used and imparted a higher impact strength based on formulations that produced the same level of elastic modulus.

When MBS was compared with SBS, the former was superior in all aspects of flexural strength, flexural modulus of elasticity and impact strength (on DuPont tester) based on formulations that contained MBS and SBS in equal proportions. This shows that a toughness-imparting component having a core/shell structure was more effective than a mere block copolymer.

Chlorinated polyethylene had a high toughness imparting effect but at the same time, the specimen containing it experienced a substantial decrease in elastic modulus. It is therefore assumed that chlorinated polyethylene works as if it were a plasticizer.

Having the features described on the foregoing pages, the method of the present invention offers the following advantages: 1) The particles of a thermoplastic resin component are subjected to secondary agglomeration to form larger particles having a size in the range of 10–1000 $\mu$m, so they will not scatter about the molding machine during its operation and they have a sufficient flowability to be supplied consistently through the hopper on the molding machine; 2) The particles of the thermoplastic resin component which form the island phase have a size of 0.01–10 $\mu$m and are dispersed microscopically in the sea phase of a thermosetting matrix, so that subsequent to the kneading of the two resin components, a molded article can be directly fabricated from a composite material that attains a balance between high levels of stiffness heat resistance and toughness; and 3) If a rubber-like material composed of particles with a core/shell structure is used as the thermoplastic resin component, a molded article can be fabricated that is much better in toughness than a product that employs a mere block copolymer.

What is claimed is:

1. A method of producing a molded resin article using a kneading machine and a mold, the method comprising:
   successively feeding a plurality of materials into said kneading machine with a time lag between feeding each material,
   kneading said plurality of materials into a mixture of said material, and
   injecting said mixture into a mold and molding and curing said mixture into said article,
   wherein a first one of said materials which is fed into said kneading machine first comprises a first material having a viscosity, which is higher and a reactivity which is lower than those of a second one of said materials, when compared in a molten state after said first and second materials are fed and kneaded, which is fed into said kneading machine after said first one of said materials, kneading of said first one of said materials beginning prior to kneading of said second one of said materials, said first one of said materials comprising a thermoplastic resin and said second one of said materials comprising a thermosetting resin.

2. The method of claim 1, further comprising controlling the feeding of said materials so that a viscosity of said mixture when it is injected into said mold is in a range of 200 to 5000 poises.

3. The method of claim 1, wherein said kneading machine is an axially-extending screw-type extruder having a plurality of feed inlets arranged axially therealong, said extruder having a discharge port, and said first one of said materials is fed to one of said feed inlets farther from said discharge port relative to another one of said feed inlets at which said second one of said materials is fed into said extruder, said mixture being injected into said mold from said discharge port.

4. The method of claim 3, wherein said plurality of materials is fed into said extruder and said kneading is performed so that the viscosity of said mixture in said extruder decreases toward said discharge port.

5. A method of producing a molded resin article from a plurality of materials including a first material and a second material by using a kneading machine and a mold, the method comprising:
feeding said plurality of materials including said first and second materials into said kneading machine, said second material being fed into said kneading machine at a predetermined time after said first material is fed into said kneading machine;
kneading said plurality of materials including said first and second materials to form a mixture of said plurality of materials, said second material being kneaded for a period of time which is less than the time which said first material is kneaded by said predetermined time;
injecting said mixture into said mold, and molding and curing said mixture into said article,
wherein said first material has a viscosity which is higher and a reactivity which is lower than those of said second material at the time said first and second materials are fed into said machine,
wherein said plurality of materials further includes a third material comprising at least a peroxide catalyst, said third material being fed to said kneading machine after said second material, and said third material being kneaded for a shorter time than said second material, and wherein said first material comprises a thermoplastic resin material and said second material comprises a thermosetting material.

6. The method of claim 5, wherein said period of time and said predetermined time and respective temperatures of said first and second materials upon feeding said first and second materials into said kneader are selected such that said mixture has a viscosity in a range of 200 to 5000 poises upon injection into said mold.

7. A method of producing a molded resin article from a plurality of materials including a first material and a second material by using a kneading machine and a mold, the method comprising:
feeding said plurality of materials including said first and second materials into said kneading machine, said second material being fed into said kneading machine at a predetermined time after said first material is fed into said kneading machine;
kneading said plurality of materials including said first and second materials to form a mixture of said plurality of materials, said second material being kneaded for a period of time which is less than the time which said first material is kneaded by said predetermined time;
injecting said mixture into said mold, and molding and curing said mixture into said article,
wherein said first material has a viscosity which is higher and a reactivity which is lower than those of said second material at the time said first and second materials are fed into said machine, wherein said plurality of materials further includes a third material comprising at least one of a nonpolymeric solid particulate material and a catalyst, said third material being fed to said kneading machine after said second material, and said third material being kneaded for a shorter time than said second material.

8. A method of producing a molded resin article from a plurality of materials including a first material and a second material by using a kneading machine and a mold, the method comprising:
feeding said plurality of materials including said first and second materials into said kneading machine, said second material being fed into said kneading machine at a predetermined time after said first material is fed into said kneading machine;
kneading said plurality of materials including said first and second materials to form a mixture of said plurality of material, said second material being kneaded for a period of time which is less than the time which said first material is kneaded by said predetermined time;
injecting said mixture into said mold, and molding and curing said mixture into said article,
wherein said first material has a viscosity which is higher and a reactivity which is lower than those of said second material at the time said first and second materials are fed into said machine, wherein said plurality of materials further includes a fibrous reinforcement material which is fed to said kneading machine after said second material, and which is kneaded for a time shorter than said second material.

9. The method of claim 1, wherein said plurality of materials includes a third material comprising one of a thermoplastic and thermosetting resin, said third material having a viscosity and reactivity intermediate those of said first and second ones of said materials when fed into said kneading machine and being fed to said kneading machine at a time after said first one and before said second one of said materials.

10. The method of claim 1, wherein all of said materials are fed in order of descending viscosity and increasing reactivity.

11. A method of fabricating a molded article from a composite material that comprises a thermosetting resin component for providing stiffness and heat resistance and a thermoplastic resin component for providing toughness, said method comprising the following steps:
subjecting particles of said thermoplastic resin component to secondary agglomeration to produce larger particles of 10–1000 $\mu$m that can be dissociated by shearing;
kneading the agglomerated particles under shear force with a portion of the thermosetting resin component which has a relatively low reactivity and a relatively high viscosity, at a time said portion is fed into a machine, thereby allowing the particles to be dispersed microscopically in that portion;
thereafter, successively adding portions of the thermosetting resin component which have a relatively high reactivity and a relatively low viscosity, at a time said portions are fed into the machine, with a time lag being provided between a first added portion having the lower reactivity and the higher viscosity and a next added portion having the higher reactivity and the lower viscosity; and
injecting the kneaded mixture into a mold where it is given a desired shape and allowed to solidify simultaneously with completion of the curing of the thermosetting resin component, whereby said composite material comprises substantially similar proportions of said thermoplastic resin component and said thermosetting resin component, and islands of said thermoplastic resin component having a particle size of 0.01–10 μm are microscopically dispersed in a sea of the thermosetting resin matrix to provide an island-in-sea structure.

12. A method according to claim 11 wherein said thermoplastic resin component is a rubber-like component.

13. A method according to claim 12 wherein said rubber-like component is a fine particulate rubber that is prepared by emulsion polymerization and which has been processed to acquire an anti-blocking property.

14. A method according to claim 12 wherein said rubber-like component is formed of particles having one of a core/shell structure and a salami-sausage structure.

15. A method of fabricating a molded article from thermoplastic and thermosetting resin components, the method comprising:

agglomerating particles of said thermoplastic resin component having a diameter of 0.01 to 10 μm into larger particles having a diameter of 10 to 1000 μm;

kneading said larger particles of said thermoplastic resin component with a relatively low reactivity and high viscosity portion, at a time said portion is fed into a machine, of a thermosetting resin component to break down and microscopically disperse said larger particles of said thermoplastic resin component into 0.01 to 10 μm diameter particles in a sea of a portion of said thermosetting component;

adding remaining portions of said thermosetting resin component having relatively higher reactivities and relatively lower viscosities, at a time said remaining portions are fed into the machine, to said thermoplastic component dispersed in said portion of said thermosetting component to form a mixture; and molding said mixture.

16. A method according to claim 15, wherein a weight ratio of said thermosetting component to said thermoplastic component is in a range of 25:75 to 75:25.

17. The method as defined in claim 1, wherein said first and second materials are fed and kneaded at the lowest temperature that allows said first material to be melted and kneaded under a predetermined shear force so as to achieve a predetermined dispersion.

18. A method according to claim 12, wherein said rubber-like component is a partially-cured rubber.

* * * * *